(12) United States Patent
Gallagher et al.

(10) Patent No.: US 9,506,422 B2
(45) Date of Patent: Nov. 29, 2016

(54) EFFICIENT, LOW PRESSURE RATIO PROPULSOR FOR GAS TURBINE ENGINES

(75) Inventors: Edward J. Gallagher, West Hartford, CT (US); Byron R. Monzon, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 311 days.

(21) Appl. No.: 13/176,365

(22) Filed: Jul. 5, 2011

(65) Prior Publication Data

US 2013/0008146 A1    Jan. 10, 2013

(51) Int. Cl.
*F02K 3/075*  (2006.01)
*F02K 3/06*   (2006.01)
*F01D 17/14*  (2006.01)
*F02K 1/06*   (2006.01)

(52) U.S. Cl.
CPC ............... *F02K 3/06* (2013.01); *F01D 17/14* (2013.01); *F02K 1/06* (2013.01); *F05D 2220/327* (2013.01)

(58) Field of Classification Search
CPC ............ F01D 17/14; F02K 3/06; F02K 1/06; F05D 2220/327
USPC ..................... 60/226.1, 262, 226.3
See application file for complete search history.

(56) References Cited

U.S. PATENT DOCUMENTS

| | | | |
|---|---|---|---|
| 3,287,906 A | 11/1966 | McCormick | |
| 5,915,917 A | 6/1999 | Eveker et al. | |
| 6,195,983 B1 | 3/2001 | Wadia et al. | |
| 6,709,239 B2 | 3/2004 | Chandraker | |
| 7,107,756 B2 | 9/2006 | Rolt | |
| 7,374,403 B2 | 5/2008 | Decker et al. | |
| 7,758,306 B2 | 7/2010 | Burton et al. | |
| 7,770,377 B2 | 8/2010 | Rolt | |
| 7,882,691 B2 * | 2/2011 | Lemmers et al. | 60/39.163 |
| 7,950,237 B2 * | 5/2011 | Grabowski et al. | 60/771 |
| 9,121,412 B2 | 9/2015 | Gallagher et al. | |
| 2006/0228206 A1 * | 10/2006 | Decker et al. | 415/1 |
| 2008/0095633 A1 | 4/2008 | Wilson | |
| 2008/0155961 A1 * | 7/2008 | Johnson | 60/226.3 |
| 2008/0206048 A1 | 8/2008 | Coupe et al. | |
| 2010/0089019 A1 | 4/2010 | Knight et al. | |
| 2010/0148396 A1 | 6/2010 | Xie et al. | |

(Continued)

FOREIGN PATENT DOCUMENTS

| | | |
|---|---|---|
| EP | 1712738 | 10/2006 |
| GB | 1516041 | 6/1978 |

(Continued)

OTHER PUBLICATIONS

Kandebo; Geared-Turbofan Engine Design Targets Cost, Complexity, Aviation Week & Space Technology; New York; Feb. 23, 1998, 4 pp.

(Continued)

*Primary Examiner* — Zelalem Eshete
(74) *Attorney, Agent, or Firm* — Carlson, Gaskey & Olds, P.C.

(57) ABSTRACT

A gas turbine engine includes a spool, a turbine coupled to drive the spool, and a propulsor that is coupled to be driven by the turbine through the spool. A gear assembly is coupled between the propulsor and the spool such that rotation of the turbine drives the propulsor at a different speed than the spool. The propulsor includes a hub and a row of propulsor blades that extends from the hub. The row includes no more than 20 of the propulsor blades.

11 Claims, 2 Drawing Sheets

(56) References Cited

U.S. PATENT DOCUMENTS

| | | | |
|---|---|---|---|
| 2010/0218483 | A1* | 9/2010 | Smith .......................... 60/262 |
| 2010/0260609 | A1 | 10/2010 | Wood et al. |
| 2010/0331139 | A1 | 12/2010 | McCune |

FOREIGN PATENT DOCUMENTS

| | | |
|---|---|---|
| GB | 2041090 | 9/1980 |
| GB | 2426792 | 12/2006 |
| WO | 2007038674 | 4/2007 |
| WO | 2015034630 | 3/2015 |
| WO | 2015047511 | 4/2015 |

OTHER PUBLICATIONS

Hendricks et al, "Performance and Weight Estimates for an Advanced Open Rotor Engine" NASA/TM-2012-217710, Sep. 2012, 20 pp.

Gunston, "Jane's Aero-Engines" Pratt & Whitney/USA, Mar. 2000, JAEng-Issue 7, 5 pp.

Zalud, T. (1998). "Gears Put a New Spin on Turbofan Performance" Nov. 5, 1998, 2010 Penton Media, Inc.

Meier, N. (2005). Civil Turbojet/Turbofan Specifications. Retrieved from http://www.jet-engine.net/civtfspec.html.

Gray, D.E. et al. (1978). Energy efficient engine preliminary design and integration study. United Technologies corporation; Pratt & Whitney Aircraft Group. Prepared for NASA. Nov. 1, 1978. pp. 1-366.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Kiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Endus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Pat. No. 9,121,412.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Willis, W. S. (1979). Quiet clean short-haul experimental engine final report. Prepared for NASA. Aug. 1979. pp. 1-293.

Sweetman, B. and Sutton, O. (1998). Pratt & Whitney's surprise leap: The announcement of the PW8000 geared turbofan caught the industry unawares. Interavia. Jun. 1998; 53, 621. pp. 25-26.

Brines, G. (1990). The turbofan of tomorrow. Mechanical Engineering; The Journal of the American Society of Mechanical Engineers. 112, 8. pp. 65-67.

Mattingly, J.D. (1996). Elements of gas turbine propulsion. McGraw-Hill. New York, NY. pp. 1-18, 60-2, 85-7, 35-104, 121-3, 223-234, 242-5, 278-285, 303-9, 323-6, 462-479, 517-20, 563-5, 630-2, 673-5, 682-5, 697-9, 703-5, 302-5, 862-4, 923-5.

(56) References Cited

OTHER PUBLICATIONS

Gunston, B.(2000). Ed. Jane's aero-engines. Issue Seven. Janes Information Group Limited. Alexandria, VA. pp. 510-512.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF502: plugging the turbofan gap. Flight International, Jan. 30, 1982. p. 237-241.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Petition for Inter Partes Review of U.S. Pat. No. 9,121,412. pp. 1-56.

Declaration of Reza Abhari, Ph.D. In re U.S. Appl. No. 9,121,412. Executed Apr. 23, 2016. pp. 1-71.

Edkins, D.P. and Hirschkron, R.L. (1972). TF34 turbofan quiet engine study final report. NASA CR-120914. Dec. 31, 1972. pp. 1-96.

Marsh, G. (2012). Aero engines lose weight thanks to composites. Reinforced Plastics. 56(6). Nov. 1, 2012. pp. 32-35.

European Search Report for European Patent Application No. 16166928 completed Sep. 7, 2016.

European Search Report for European Patent Application No. 12174431 completed Sep. 8, 2016.

\* cited by examiner

EFFICIENT, LOW PRESSURE RATIO PROPULSOR FOR GAS TURBINE ENGINES

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbo fan architecture that is designed to efficiently operate with a high bypass ratio and a low pressure ratio.

The propulsive efficiency of a gas turbine engine depends on many different factors, such as the design of the engine and the resulting performance debits on the fan that propels the engine. As an example, the fan rotates at a high rate of speed such that air passes over the blades at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

An exemplary gas turbine engine includes a spool, a turbine coupled to drive the spool, and a propulsor that is coupled to be driven by the turbine through the spool. A gear assembly is coupled between the propulsor and the spool such that rotation of the turbine drives the propulsor at a different speed than the spool. The propulsor includes a hub and a row of propulsor blades that extend from the hub. The row includes no more than 20 of the propulsor blades.

In another aspect, a gas turbine engine includes a core flow passage and a bypass flow passage. A propulsor is arranged at an inlet of the bypass flow passage and core flow passage. The propulsor includes a hub and a row of propulsor blades that extend from the hub. The row includes no more than 20 of the propulsor blades and the bypass flow passage has a design pressure ratio of approximately 1.3-1.55 with regard to an inlet pressure and an outlet pressure of the bypass flow passage.

An exemplary propulsor for use in a gas turbine engine includes a rotor having a row of propulsor blades that extends radially outwardly from a hub. Each of the propulsor blades extends radially between a root and a tip and in a chord direction between a leading edge and a trailing edge to define a chord dimension at the tip of each propulsor blade. The row of propulsor blades defines a circumferential pitch with regard to the tips. The row of propulsor blades has a solidity value defined as the chord dimension divided by the circumferential pitch. The row also includes a number of the propulsor blades that is no greater than 20 such that a ratio of the number of propulsor blades to the solidity value is from 9 to 20.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
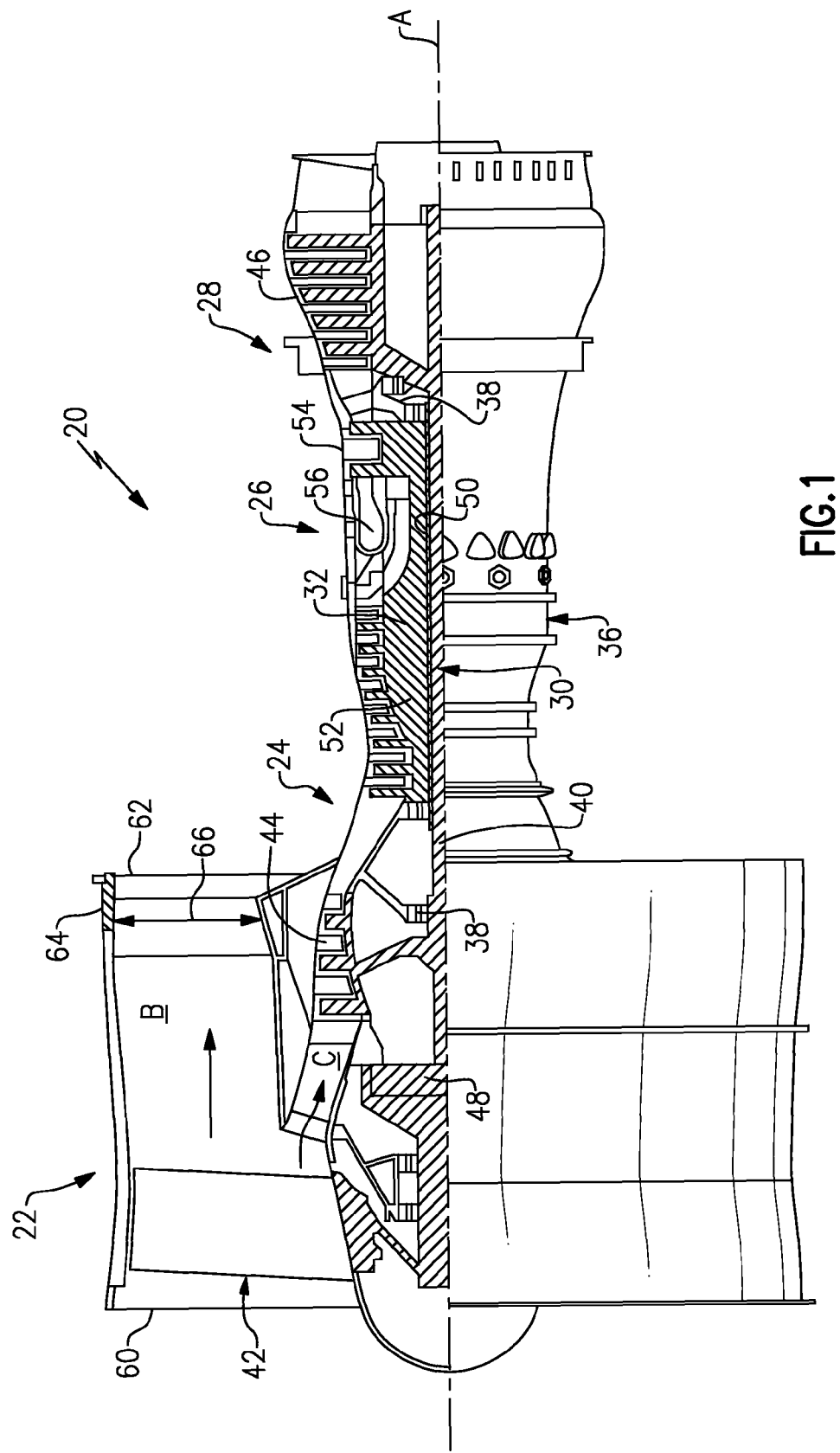
FIG. 1 is a schematic cross-section of a gas turbine engine.

FIG. 1 schematically illustrates a gas turbine engine 20. The gas turbine engine 20 may be a two-spool turbofan that generally incorporates a fan section 22, a compressor section 24, a combustor section 26 and a turbine section 28. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. Although depicted as a turbofan gas turbine engine, it is to be understood that the concepts described herein are not limited to use with turbofans and the teachings may be applied to other types of gas turbine engines.

The engine 20 includes a low speed spool 30 and high speed spool 32 mounted for rotation about an engine central longitudinal axis A relative to an engine static structure 36 via several bearing systems 38. The low speed spool 30 generally includes an inner shaft 40 that is coupled with a propulsor 42, a low pressure compressor 44 and a low pressure turbine 46. The low pressure turbine 46 drives the propulsor 42 through the inner shaft 40 and a gear assembly 48, which allows the low speed spool 30 to drive the propulsor 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in core flow passage C is compressed by the low pressure compressor 44 then the high pressure compressor 52, mixed with the fuel in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and core flow passage C. Air flow through the bypass flow passage B exits the engine 20 through an outlet 62 or nozzle. For a given design of the propulsor 42, the inlet 60 and the outlet 62 of the engine 20 define a design pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
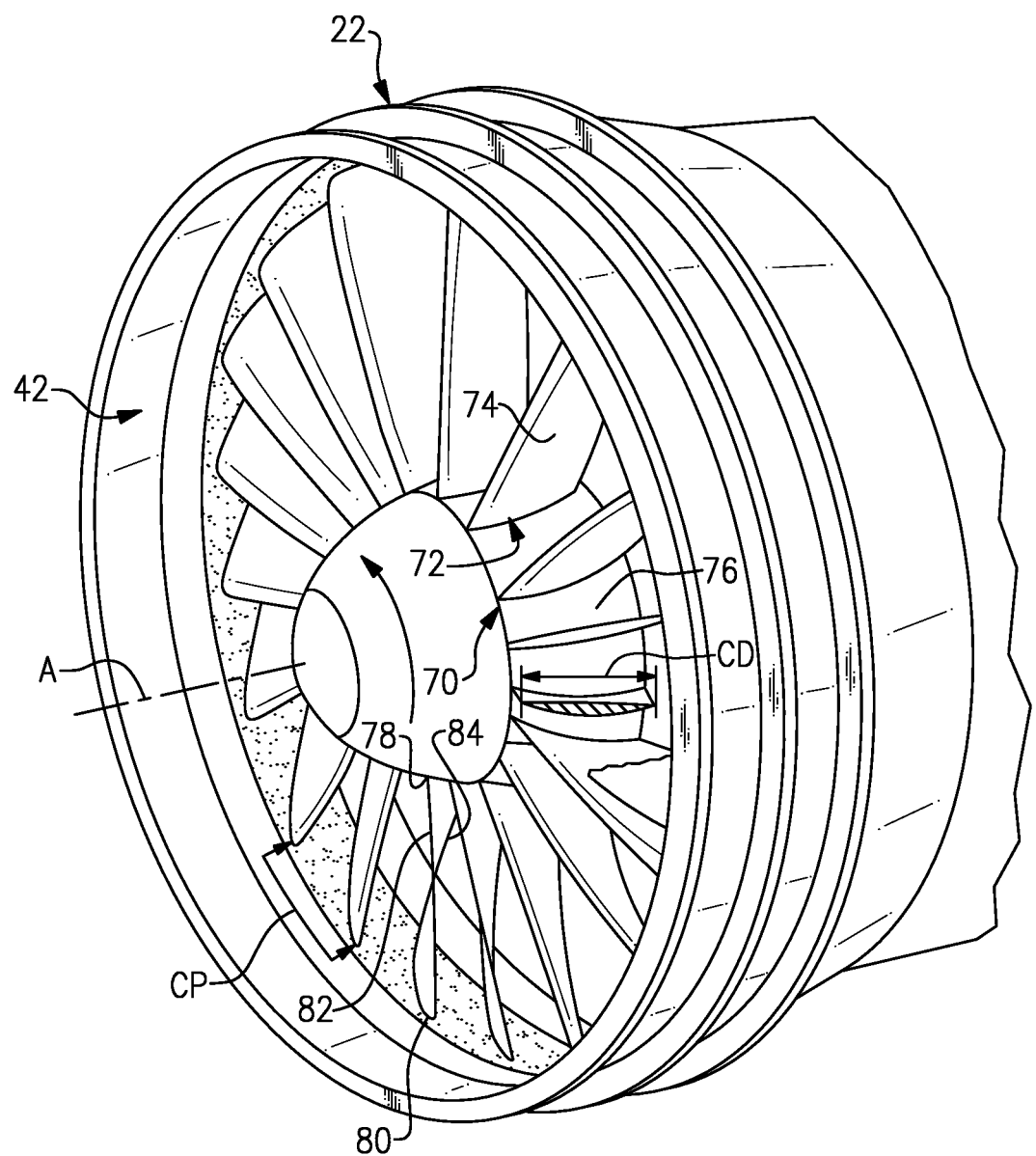
FIG. 2 is a perspective view of a fan section of the engine of FIG. 1.

Referring to FIG. 2, the propulsor 42, which in this example is a fan, includes a rotor 70 having a row 72 of propulsor blades 74 that extend a circumferentially around a hub 76. Each of the propulsor blades 74 extends radially outwardly from the hub 76 between a root 78 and a tip 80 and in a chord direction (axially and circumferentially) between a leading edge 82 and a trailing edge 84. A chord dimension (CD) is a length between the leading edge 82 and the trailing edge 84 at the tip of each propulsor blade 74. The row 72 of propulsor blades 74 also defines a circumferential pitch (CP) that is equivalent to the arc distance between the tips 80 of neighboring propulsor blades 74.

As will be described, the example propulsor 42 includes a number (N) of the propulsor blades 74 and a geometry that, in combination with the architecture of the engine 20, provides enhanced propulsive efficiency by reducing performance debits of the propulsor 42.

In the illustrated example, the number N of propulsor blades in the row 72 is no more than 20. In one example, the propulsor 42 includes 18 of the propulsor blades 74 uniformly circumferentially arranged about the hub 76. In other embodiments, the number N may be any number of blades from 12-20.

The propulsor blades 74 define a solidity value with regard to the chord dimension CD and the circumferential pitch CP. The solidity value is defined as a ratio (R) of CD/CP (i.e., CD divided by CP). In embodiments, the solidity value of the propulsor 42 is between 1.0 and 1.3. In further embodiments, the solidity value is from 1.1 to 1.2.

Additionally, in combination with the given example solidity values, the engine 20 may be designed with a particular design pressure ratio. In embodiments, the design pressure ratio may be between 1.3 and 1.55. In a further embodiment, the design pressure ratio may be between 1.3 and 1.4.

The engine 20 may also be designed with a particular bypass ratio with regard to the amount of air that passes through the bypass flow passage B and the amount of air that passes through the core flow passage C. As an example, the design bypass ratio of the engine 20 may nominally be 12, or alternatively in a range of approximately 8.5 to 13.5.

The propulsor 42 also defines a ratio of N/R. In embodiments, the ratio N/R is from 9 to 20. In further embodiments, the ratio N/R is from 14 to 16. The table below shows additional examples of solidity and the ratio N/R for different numbers of propulsor blades 74.

TABLE

Number of Blades, Solidity and Ratio N/R

| Number of Blades (N) | Solidity | Ratio N/R |
|---|---|---|
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

The disclosed ratios of N/R enhance the propulsive efficiency of the disclosed engine 20. For instance, the disclosed ratios of N/R are designed for the geared turbo fan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a spool;
   a turbine coupled to drive the spool;
   a propulsor coupled to be driven by said turbine through said spool, said propulsor being located at an inlet of a core flow passage and bypass flow passage having a design pressure ratio that is between 1.3 and 1.4, with regard to an inlet pressure and an outlet pressure of said bypass flow passage, at a design rotational speed of the propulsor, said bypass flow passage defining a bypass ratio of 8.5 to 13.5 with regard to flow through said bypass flow passage and flow through said core flow passage; and
   a gear assembly coupled between said propulsor and said spool such that rotation of said spool drives said propulsor at a lower speed than said spool, said propulsor being susceptible at said lower speed to propulsive losses from at least one of flow discontinuities, shocks and turbulence,
   wherein said propulsor includes a hub and a row of propulsor blades that extend from said hub, and said row includes a number (N) of said propulsor blades that is no more than 20, and wherein each of said propulsor blades extends radially between a root and a tip and in a chord direction between a leading edge and a trailing edge at the tip to define a chord dimension (CD), said row of propulsor blades defining a circumferential pitch (CP) with regard to said tips, said row of propulsor blades including a solidity value (R) of CD/CP that is between 1.0 and 1.3 and a ratio of N/R from 9 to 20 to manage said propulsive losses at said lower speed.

2. The gas turbine engine as recited in claim 1, wherein R is from 1.1 to 1.2.

3. The gas turbine engine as recited in claim 1, further comprising a low pressure compressor section and a low pressure turbine section that are each coupled to be driven through said spool, and a high pressure compressor section and a high pressure turbine section that are coupled to be driven through another spool.

4. The gas turbine engine as recited in claim 1, wherein a ratio of N/R is from 9 to 14.

5. The gas turbine engine as recited in claim 1, wherein the ratio of N/R is 9 to 15.

6. The gas turbine engine as recited in claim 1, including a variable area nozzle operative to change a cross-sectional area of an outlet of said bypass flow passage.

7. The gas turbine engine as recited in claim 1, wherein the number (N) is a total number of said propulsor blades, said total number being between 12 and 20 and said propulsor blades all being equally circumferentially spaced.

8. The gas turbine engine as recited in claim 1, wherein said number (N) of said propulsor blades, said solidity value (R), and said ratio of N/R are in a combination selected from the Table:

| Number of Blades (N) | Solidity | Ratio N/R |
|---|---|---|
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0. |

9. The gas turbine engine as recited in claim 8, wherein the number (N) of said blades is 20.

10. The gas turbine engine as recited in claim 8, wherein the number (N) of said blades is 18.

11. The gas turbine engine as recited in claim 8, wherein the number (N) of said blades is 16, 18, or 20.

* * * * *